(12) United States Patent
Mah et al.

(10) Patent No.: US 10,162,698 B2
(45) Date of Patent: Dec. 25, 2018

(54) SYSTEM AND METHOD FOR AUTOMATED ISSUE REMEDIATION FOR INFORMATION TECHNOLOGY INFRASTRUCTURE

(71) Applicant: Dropbox, Inc., San Francisco, CA (US)

(72) Inventors: David Mah, San Francisco, CA (US); Scott MacFiggen, San Francisco, CA (US); John Watson, Sunnyvale, CA (US)

(73) Assignee: Dropbox, Inc., San Francisco, CA (US)

( * ) Notice: Subject to any disclaimer, the term of this patent is extended or adjusted under 35 U.S.C. 154(b) by 183 days.

(21) Appl. No.: 15/170,820

(22) Filed: Jun. 1, 2016

(65) Prior Publication Data

US 2017/0279702 A1  Sep. 28, 2017

Related U.S. Application Data

(60) Provisional application No. 62/313,572, filed on Mar. 25, 2016.

(51) Int. Cl.
*G06F 11/07* (2006.01)
*H04L 12/26* (2006.01)
(Continued)

(52) U.S. Cl.
CPC ........ *G06F 11/079* (2013.01); *G06F 11/0703* (2013.01); *G06F 11/0748* (2013.01);
(Continued)

(58) Field of Classification Search
CPC ............. G06F 11/0703; G06F 11/0706; G06F 11/0709; G06F 11/0748; G06F 11/0751; G06F 11/0766; G06F 11/0772; G06F 11/0775; G06F 11/079; G06F 11/0793; H04L 41/06; H04L 41/0631; H04L 41/065; H04L 41/0654; H04L 41/0672;
(Continued)

(56) References Cited

U.S. PATENT DOCUMENTS 7,263,632 B2 * 8/2007 Ritz .................... G06F 11/0709
714/25
7,293,201 B2 * 11/2007 Ansari ................ G06F 11/0748
714/25

(Continued)

OTHER PUBLICATIONS

Juve et al., "Automating Application Deployment in Infrastructure Clouds", 2011 IEEE Third International Conference on Cloud Computing Technology and Science, 2011, pp. 658-665.*

(Continued)

*Primary Examiner* — Vivek Srivastava
*Assistant Examiner* — William C McBeth
(74) *Attorney, Agent, or Firm* — Hickman Palermo Becker Bingham LLP; Adam C. Stone

(57) ABSTRACT

A system and method for extensible, protective, and verifiable automated issue remediation for information technology infrastructure comprises invoking an application programming interface to obtain at least one issue object corresponding to an alert generated by a monitoring system; matching the issue object to at least one diagnosis plugin of a plurality of diagnosis plugins; obtaining a prescription object from the diagnosis plugin, the prescription object comprising a remedy; and invoking the remedy after verifying the remedy is authorized to proceed.

20 Claims, 12 Drawing Sheets

(51) Int. Cl.
*H04L 12/24* (2006.01)
*H04W 4/12* (2009.01)

(52) U.S. Cl.
CPC .......... *G06F 11/0793* (2013.01); *H04L 41/08* (2013.01); *H04L 41/5038* (2013.01); *H04L 41/5041* (2013.01); *H04L 43/12* (2013.01); *H04W 4/12* (2013.01)

(58) Field of Classification Search
CPC . H04L 41/08; H04L 41/0876; H04L 41/0883; H04L 41/0886; H04L 41/5038; H04L 41/5041; H04L 43/04; H04L 43/08; H04L 43/0805; H04L 43/0811; H04L 43/0817; H04L 43/0827; H04L 43/10; H04L 43/12; H04L 43/14
See application file for complete search history.

(56) References Cited

U.S. PATENT DOCUMENTS

| | | | |
|---|---|---|---|
| 7,490,073 B1* | 2/2009 | Qureshi | G06N 5/048 706/50 |
| 8,527,811 B2 | 9/2013 | Gilbert et al. | |
| 8,645,756 B1* | 2/2014 | Lee | G06F 11/0784 714/26 |
| 9,021,310 B1* | 4/2015 | McCabe | H04L 41/0659 714/43 |
| 9,183,072 B1* | 11/2015 | Makuch | G06F 11/0709 |
| 9,244,808 B2 | 1/2016 | Ramachandra et al. | |
| 9,585,034 B1* | 2/2017 | Jadunandan | H04W 24/04 |
| 2003/0177417 A1 | 9/2003 | Malhotra et al. | |
| 2005/0015678 A1* | 1/2005 | Miller | G06F 11/0748 714/38.14 |
| 2005/0102569 A1* | 5/2005 | Wu | G06F 11/2257 714/25 |
| 2005/0223285 A1* | 10/2005 | Faihe | G06F 11/0709 714/25 |
| 2007/0233633 A1* | 10/2007 | Keith, Jr. | G06N 5/04 706/60 |
| 2008/0109683 A1* | 5/2008 | Erwin | G06F 11/0709 714/46 |
| 2008/0288821 A1* | 11/2008 | Aaron | G06F 11/0709 714/26 |
| 2009/0106601 A1* | 4/2009 | Ngai | G06F 11/0748 714/39 |
| 2009/0158099 A1* | 6/2009 | Cui | G06F 11/0748 714/57 |
| 2010/0094991 A1* | 4/2010 | Parikh | G06F 15/173 709/224 |
| 2011/0197090 A1* | 8/2011 | Colbert | G06F 11/0715 714/2 |
| 2013/0007527 A1* | 1/2013 | Petukhov | G06F 11/0793 714/37 |
| 2014/0122688 A1* | 5/2014 | Partida | G06F 11/0793 709/224 |
| 2014/0244816 A1 | 8/2014 | Anerousis et al. | |
| 2015/0178063 A1* | 6/2015 | Narkinsky | G06F 8/65 717/168 |
| 2015/0293800 A1* | 10/2015 | Shivanna | G06F 11/0748 714/37 |
| 2016/0239374 A1* | 8/2016 | Schnegelberger | G06F 11/0793 |
| 2016/0239487 A1* | 8/2016 | Potharaju | G06F 17/3053 |
| 2016/0335414 A1* | 11/2016 | Isaacs | G06F 19/3456 |
| 2017/0034036 A1* | 2/2017 | Kohan | H04L 67/16 |
| 2017/0060654 A1* | 3/2017 | Nandakumar | G06F 11/079 |
| 2017/0199795 A1* | 7/2017 | Allen | G06F 11/2033 |
| 2017/0269988 A1* | 9/2017 | Alfaro Bergueiro | G06F 11/0793 |

OTHER PUBLICATIONS

Kavulya, Soda, "Automated Diagnosis of Chronic Performance Problems in Production Systems", Carnegie Mellon University, Theses and Dissertations, dated May 2013, 166 pages.

* cited by examiner

SYSTEM AND METHOD FOR AUTOMATED ISSUE REMEDIATION FOR INFORMATION TECHNOLOGY INFRASTRUCTURE

CROSS-REFERENCE TO RELATED APPLICATION(S)

This application claims the benefit of U.S. Provisional Application Ser. No. 62/313,572, filed on Mar. 25, 2016, which is incorporated herein in its entirety by this reference.

TECHNICAL FIELD

The example embodiments of the invention described herein relate generally to the information technology infrastructure field, and more specifically to new and useful system and method for automated issue remediation for information technology infrastructure.

BACKGROUND

Platforms exist for monitoring information technology infrastructure. When failures occur, such platforms alert technical staff of the problem, allowing them to begin remediation processes before outages affect business processes, end-users, or customers. Traditional methods of remediation suffer from lack of automation. Newer methods of remediation using automation exist, but these methods often (1) are not extensible, (2) fail to provide adequate protection against automation that exacerbates rather than remediates the problem, or (3) fail to allow an appropriate level of verification of the automation by humans. Thus, there is a need in the information technology infrastructure field for a system and method for automated issue remediation that is extensible, protective, and verifiable. The present invention provides such a system and method.

DESCRIPTION OF EXAMPLE EMBODIMENTS

In the following description, for the purposes of explanation, numerous specific details are set forth in order to provide a thorough understanding of the example embodiments the present invention. It will be apparent, however, that the example embodiments may be practiced without these specific details. In other instances, well-known structures and devices are shown in schematic representation form in order to avoid unnecessarily obscuring the example embodiments.

System for Automated Issue Remediation

Figure 1:
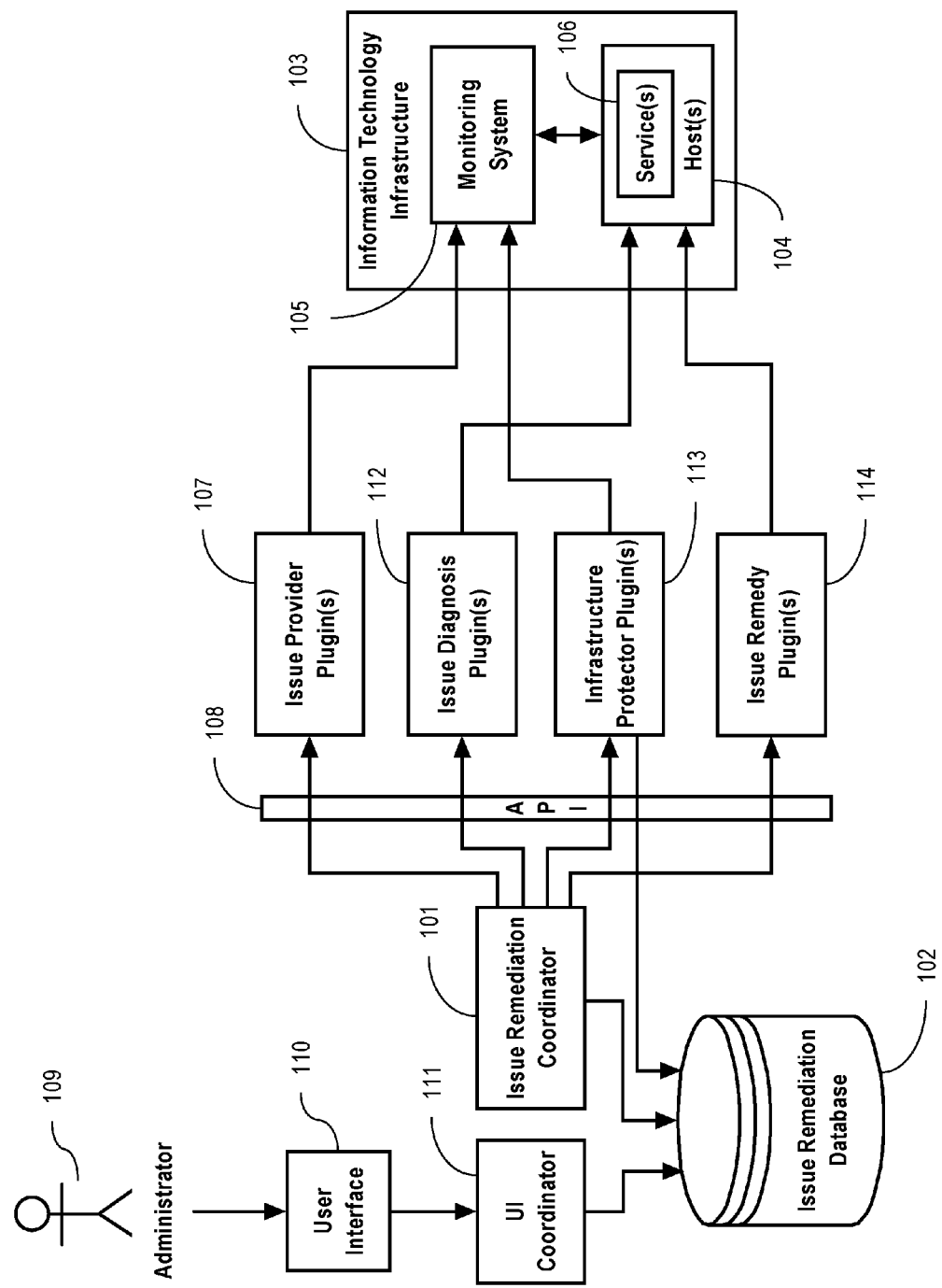
FIG. 1 is a schematic representation of a system according to an example embodiment of the present invention.

As shown in FIG. 1, a system for automated issue remediation according to an example embodiment of the present invention can include an issue remediation coordinator 101 and an issue remediation database 102. The system provides a simple interface for system plugins to perform automated issue remediation for information technology (IT) infrastructure 103. An interface to the system preferably enables a user, developer, or developer-operations personnel to author or code new system plugins for IT infrastructure. During operation of the IT infrastructure, the system can obtain remedies to various infrastructure issues. When a particular remedy is prescribed for an issue, infrastructure protections corresponding to the particular remedy can be verified before the particular remedy itself is applied to the IT infrastructure. The system can preferably provide improved efficiency and more automated issue remediation, compared to a trouble ticketing or helpdesk-based remediation system, when infrastructure protections and the prescription of remedies to infrastructure issues are integrated into the operation of the infrastructure. Furthermore, the system can accommodate human verification of a prescribed remedy before the system proceeds to apply the remedy to the infrastructure. The system can be used for general issue remediation for IT infrastructure, but the system can similarly be used for IT infrastructure issue tracking, auditing, and logging.

The system may be implemented alongside IT infrastructure. The IT infrastructure may include one or more hosts 104 and an IT infrastructure monitoring system 105. A host may encompass a physical or virtual networked machine or a cluster of physical or virtual networked machines. A physical or virtual machine may be a WINDOWS machine, a LINUX/UNIX machine, a NETWARE server, a network printer, a router/switch, or other physical or virtual networked machine. A host may be addressable on the network using any suitable network addressing scheme. For example, a host may be addressed on the network using a telephone number, an Internet Protocol (IP) address, a domain name service (DNS) hostname, an Internetwork Packet Exchange (IPX) address, an X.25/X.21 address, a MAC address, or other suitable network address. In addition to a network address, a host may be associated by the monitoring system with other attributes such as a name of the host (e.g., a hostname), an identifier of a group of hosts (i.e., a host group) to which the host belongs, a host check command (e.g., a ping command) that the monitoring system executes to determine if the host is up or down, a maximum number of check attempts (e.g., one) that defines the number of times the monitoring system will retry the host check command if the prior execution of the host check command indicated that the host was not up (e.g., down or unreachable), a set of one or more time periods (e.g., every weekday between 9 am and 5 pm) during which the monitoring system is permitted to actively check the status of the host by executing the check command, a set of one or more contacts (e.g., an e-mail address, a pager number, or a page email gateway address) and/or one or more contact groups (e.g., a group of one or more contacts) for the monitoring system to notify when there is a problem detected with the host, a notification interval that defines the number of time units the monitoring system is to wait before re-notifying a contact that the host is still not up, and a set of one or more time periods (e.g., every weekday between 9 am and 5 pm) during which the monitoring system is permitted to notify a contact when the host is not up. The monitoring system may store host attribute associations in a database or other suitable datastore.

A host may provide one or more services 106. A service can either be an actual service that runs or executes on the host (e.g., a POP, SMTP, HTTP, HTTPS, SSH, or other network service). Alternatively, a service can be a type of metric associated with the host (e.g., a response to ping, the number of logged in users, the amount of free disk space, etc.). A service may have a number of different attributes associated with it by the monitoring system. A hostname of a service may identify the host that the service runs on or is associated with. A service may run on or be associated with multiple hosts. In such a case, the service may be associated by the monitoring system with multiple hostnames. A service may be associated by the monitoring system with a service check command. The service check command is executed by the monitoring system to check the status of the service. A service may be associated with other attributes by the monitoring system. A service may have a service description. The monitoring system may uniquely identify an instance of a service or a service instance by a combination of a hostname the service runs on or is associated with and the service description of the service. A service may be associated by the monitoring system with other attributes such as a maximum number of check attempts (e.g., one) that defines the number of times the monitoring system will retry the service check command if the prior execution of the service check command indicated that the service was not up (e.g., down or unreachable), a check interval that represents the number of time units the monitoring system is to wait before scheduling or performing the next check of the service, a retry interval that represents the number of time units the monitoring system is to wait before scheduling or performing a re-check of the service, a set of one or more time periods (e.g., every weekday between 9 am and 5 pm) during which the monitoring system is permitted to actively check the status of the service by executing the service check command, a set of one or more contacts (e.g., an e-mail address, a pager number, or a page email gateway address) and/or one or more contact groups (e.g., a group of one or more contacts) for the monitoring system to notify when there is a problem detected with the service, a notification interval that defines the number of time units the monitoring system is to wait before re-notifying a contact that the service is still not up, and a set of one or more time periods (e.g., every weekday between 9 am and 5 pm) during which the monitoring system is permitted to notify a contact when the service is not up. The monitoring system may store service attribute associations in a database or other suitable datastore.

The monitoring system can actively or passively check hosts and services. An active check is a check of a host or service initiated by the monitoring system. An active check is often performed by the monitoring system on a regularly scheduled basis. However, the monitoring system may allow an active check to be performed on demand. A passive check is a check of a host or service initiated by an application or process that is external to the monitoring system. Results of the passive check are then submitted by the external application or process to the monitoring system for processing.

Based on the results of an active or passive check, the monitoring system may determine that there is a problem with a host or service. The monitoring system may determine that there is a problem with a service (i.e., the service is in a problem state) if the results of an active or passive check indicate that the service is in a warning, unknown, or critical state. The monitoring system may determine that there is a problem with a host (i.e., the host is in a problem state) if the host is in a down or unreachable state. When a host or service is in a problem state, the monitoring system may generate and send an alert to specified contacts. An alert can be a notification that a host or service is in a problem state. Based on results of an active or passive check, the monitoring system may determine that a host or service is no longer in a problem state and is now in a recovered or normal state. When the monitoring system detects a host or a service that transitions from a problem state to a recovered or normal state, the monitoring system may generate and send an alert to specified contacts that the host or service has recovered.

The system of the present invention according to an example embodiment allows for a user of the system to code and provide one or more issue provider plugins 107 to the system. An issue provider plugin provides an application programming interface (API) 108 to the issue remediation coordinator. Via the API, the issue remediation coordinator can obtain a list of issues with the information technology infrastructure. In this context, an issue may represent a host or service that is in a problem state. The issue may be pending while the host or service remains in the problem state. The issue may be considered resolved (i.e., no longer pending) if the host or service recovers. An issue provider plugin may identify an issue with a host or service based on alerts generated by the monitoring system for the host or service. In particular, if the most recent alert generated by the monitoring system for a host or service indicates that the host or service is in a problem state, then the issue provider plugin may identify an issue with the host or service. The issue provider plugin may continue to identify the issue with the host or service while the most recent alert generated by the monitoring system for the host or service indicates continuous to indicate that the host or service remains in a problem state. If the most recent alert generated by the monitoring system for the host or service indicates that the host or service is not in a problem state, then the issue provider plugin may decide not to identify an issue with the host or service or identify that a prior issue with the host or service is now resolved or no longer an issue.

Figure 2:
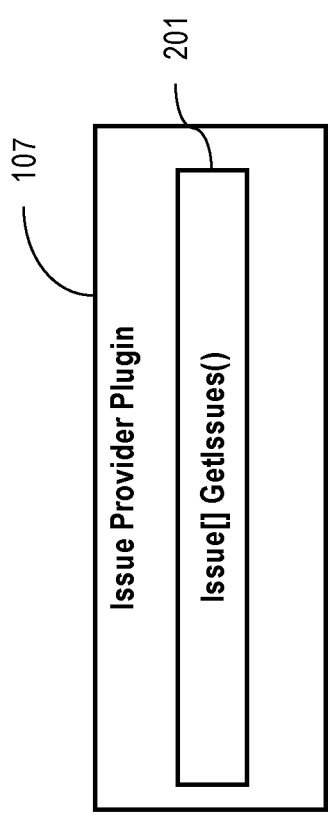
FIG. 2 is a schematic representation of an application programming interface offered by an issue provider plugin according to an example embodiment of the present invention.

FIG. 2 is a schematic representation of the API provided by an issue provider plugin to the issue remediation coordinator of the system according to an example embodiment of the present invention. The issue provider plugin may be an instance of a class or prototype defined in a computer programming language (e.g., PYTHON, JAVA, etc.) and instantiated in a computer storage media (e.g., RAM). The issue provider plugin offers an invoke-able or callable GetIssues( ) function 201. The function may have a different name according to the requirements of the particular implementation at hand. When invoked or called by the issue remediation coordinator, the GetIssues( ) function returns a list of zero or more issue objects. Each issue object in the list may represent a pending issue with the information technology infrastructure that is identified by the issue provider plugin based on alerts that are generated by the monitoring system. Alternatively, an issue object in the list may represent a recently resolved issue. For example, an issue object in the list may represent an issue that was resolved since the last time the issue remediation coordination invoked the GetIssues( ) function on the issue provider plugin. An issue provider plugin may be specifically authored by a user or developer to interface with a particular monitoring system and to identify issues based on the particular alerts generated by the particular monitoring system. For example, an issue provider plugin may be designed to operate with an instance of the NAGIOS monitoring system and the notifications generated therefrom. In addition or alternatively, an issue provider plugin may be specifically authored to identify issues based on alerts generated by a monitoring system that are specific to particular stack of information technology infrastructure. For example, an issue provider plugin may be specially authored to identify issues with a specific cluster of hosts or services based on alerts generated for the hosts or services of the cluster by a monitoring system. There may be multiple issue provider plugins that are used by the system. For example, multiple issue provider plugins may be used if the information technology infrastructure includes multiple different monitoring systems. In this case, a different issue provider plugin may be specially authored for each of the different monitoring systems. Using the API, a user of the system of the present invention according to an example embodiment can define as many different issue provider plugins as needed according to the particular requirements of the user's information technology infrastructure and monitoring systems in use.

The issue remediation coordinator may invoke or call the GetIssues( ) function of an issue provider plugin on a scheduled "get issues" interval. For example, the issue remediation coordinator may invoke or call the GetIssues( ) function of an issue provider plugin every five minutes or other length of time suitable to meet the requirements of the particular implementation at hand. Preferably, the list of issue objects returned by an issue provider plugin should include any issues identified by the issue provider plugin that are currently pending. The list may also include issue objects for recently resolved issues.

Figure 3:
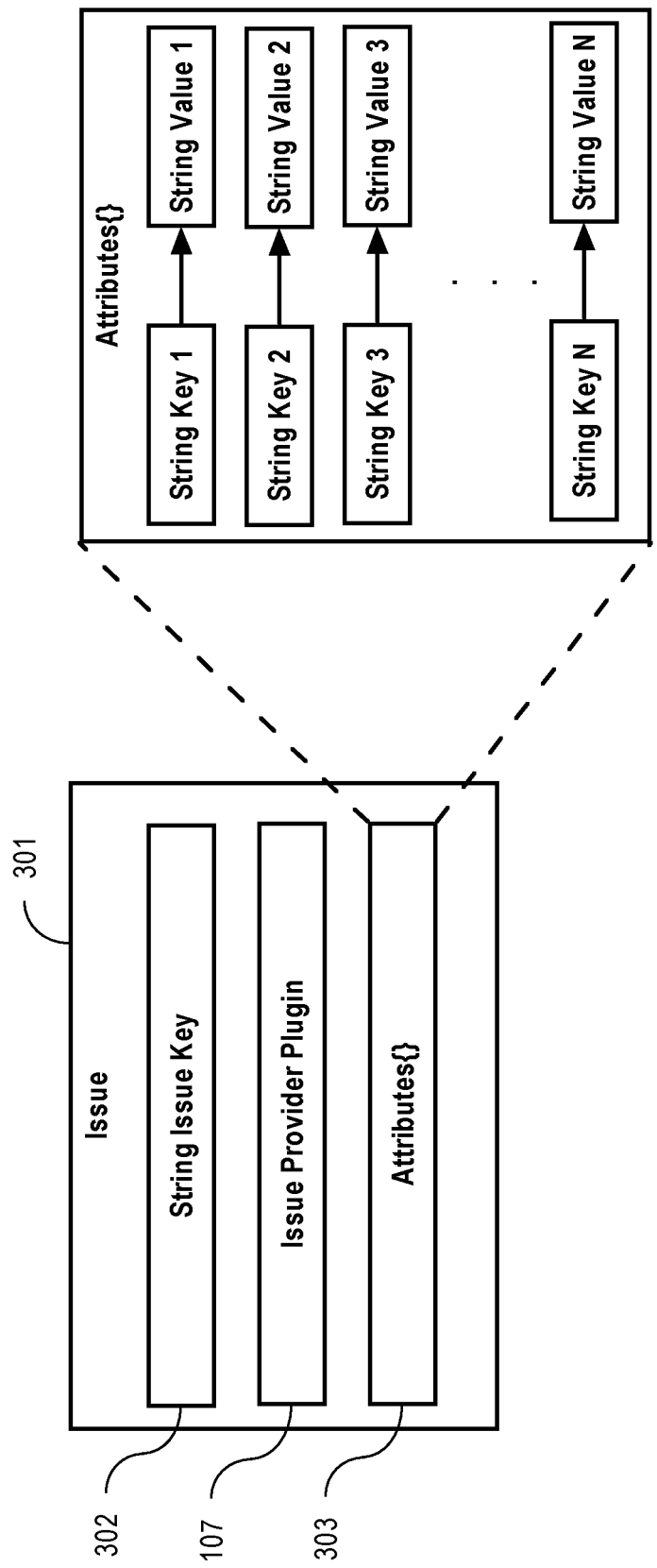
FIG. 3 is a schematic representation of an application programming interface offered by an issue object according to an example embodiment of the present invention.

FIG. 3 is a schematic representation of an application programming interface offered by an issue object 301 according to an example embodiment of the present invention. As shown, an issue object may include an issue key 302, an issue provider plugin 107, and a dictionary 303.

The issue key may uniquely identify the issue. According to an example embodiment of the present invention, the issue key is a combination of a hostname or a service name, an alert name, and a "last time ok" timestamp. This information may be obtained by the issue provider plugin from the alert or alerts generated by the monitoring system from which the issue provider plugin identified the issue. The hostname or service name may be associated with a host, in the case of a hostname, or a service, in the case of a service name, by the monitoring system that generates the alert or alerts. The alert name may reflect a current host or service state. For example, the alert name may be warning, unknown, critical in the case of a service, or down or unreachable in the case of a host. The last time ok timestamp may be a number of time units (e.g., seconds, milliseconds, etc.) since an epoch when the host or service was last known not to be in a problem state according to an active or passive check of the host or service by the monitoring system. The issue key may be character string data having a prescribed string format such as, for example, '[hostname or service name]-[alert name]-[last time ok timestamp]', where [hostname or service name], [alert name], and [last time ok timestamp] are substituted by the issue provider plugin with the appropriate values for identifying a particular identified issue at hand when instantiating an issue object representing the issue.

The issue provider plugin of an issue object may be a reference to the issue provider plugin that creates or instantiates the issue object.

The attributes dictionary includes a set of key-value pairs representing attributes of the issue. The key of a key-value pair may be the name of the attribute and the value of the key-value pair may be a value for the attribute. The attributes may be obtained by the issue provider plugin from the alert or alerts generated by the monitoring system from which the issue provider plugin identified the issue. The attributes may include attributes associated by the monitoring system with a host or service having the issue. Such attributes may include, for example, a hostname, a service name, a network address, a host group name, a service group name, or other host or service definition attributes maintained by the monitoring system. The attributes dictionary of an issue object may also include attributes that allow semantic filtering of issues represented by the issue objects. For example, an attribute of an issue object may specify an "owner" of an issue such as the "database-team." Thus, issues belonging to the database team can be identified among issue objects by filtering them for ones with an attribute named "owner" with a value of "database-team." Other issue objects may have also have the "owner" attribute but with a different value such that they are not identified through the filtering as belonging to the database team.

In operation, when the issue remediation coordinator obtains a list of issue objects as a return value from an invocation of the GetIssues( ) function of an issue provider plugin, the issue remediation coordinator may store or update issue records in the issue remediation database based on the returned list of issue objects. Each issue record may be stored in an issues table in the issue remediation database. Each issue record may be keyed by an issue key that corresponds to an issue key of an issue object obtained by the issue remediation coordinator. The issue record may also store the attributes of the most recent issue object obtained by the issue remediation coordinator having an issue key that matches the issue key of the issue record. Each issue record may also store an issue state. The issue state may be a value that specifies or indicates one of "pending" or "resolved" for the issue. If an issue object representing a pending issue and with a new issue key is obtained by the issue remediation coordinator, then the issue remediation coordinator may add a new issue record to the issues table in the issue remediation database. The new issue record may include the new issue key and the attributes from the issue object. The new issue record may also be set to indicate an issue state of pending. If an issue object representing a pending issue is obtained by the issue remediation coordinator where the coordinator earlier obtained an issue object with the same issue key, then the issue remediation coordinator may update an existing issue record in the issues table in the issue remediation database. The updated issue record may have the same issue key as the issue key of the obtained issue object. The issue record may be updated to store the attributes of the obtained issue object. The issue state of the updated issue record may remain to indicate pending.

The issue remediation coordinator may change the issue state of an issue record in the issue remediation database in response to various events. According to one scenario, the issue remediation coordinator changes the issue state of an issue record in the issue remediation database from pending to resolved if the issue remediation coordinator does not receive a corresponding issue object from an issue provider plugin in response to invoking the GetIssues( ). An issue object may correspond to an issue record if the issue key of the issue object and the issue key of the issue record are the same. The absence of the corresponding issue object in the list returned from the GetIssues( ) call may indicate that the issue represented by the issue record is no longer pending and has been resolved. In this case, the coordinator may change the issue state of the existing issue record from pending to resolved.

According to another scenario, the list of issue objects returned from an invocation of the GetIssues( ) functions contains or is associated with metadata in the return value that indicates whether each issue object in the list is pending or resolved. For example, an attribute of the issue object may have a value that indicates or specifies the state of the issue represented by the issue object. The coordinator may change the issue state of an issue record representing a pending issue from pending to resolved based on whether the corresponding issue object contains or is associated with a value that indicates or specifies that the issue is no long pending and has been resolved.

According to another scenario, the API of an issue object offers a callable function that the coordinator can invoke to determine whether the issue represented by the issue object is pending or resolved. The implementation of the function may use the issue provider plugin referenced by the issue object to determine whether the issue represented by the issue object is pending or resolved. Thus, the API of the issue provider plugin may offer a callable function for determining whether an issue represented by an issue object passed to the function is currently pending or resolved. To make this determination, the issue provider plugin may be configured to use the issue key and/or select attributes of the passed issue object to identify a recent alert or recent alerts generated by the monitoring system for the host or service that had or is having the issue. From information contained in the recent alert or alerts, the issue provider plugin can determine whether the host or service is currently in a problem state or not.

According to another scenario, the API of the issue provider plugin offers a callable function that the coordinator can invoke to determine whether an issue is pending or resolved. The function, which in some embodiments is called verify_issue, accepts an issue object (or a reference thereto) as a parameter and returns a Boolean value (e.g., True) if the issue represented by the passed issue object is pending and returns a different Boolean value (e.g., False) if the issue represented by the issue object is resolved. The coordinator can update the corresponding issue record in the database to pending or resolved based on value returned from the function.

According to another scenario, the issue state of an issue record in the issue remediation database is changed from pending to resolved in response to user input by an administrator 109 received by the user interface coordinator via the user interface 110. For example, the user interface and the user interface coordinator 111 may allow the administrator to search for pending issues in the issue remediation database. The search may include one or more filters specified by the administrator that are based on one or more attributes of the issues such that only pending issues with certain matching attributes are presented in the user interface by the user interface coordinator as search results. The search results for a pending issue presented in the user interface may include any of the attributes of the corresponding issue record including components of the issue key such as the host name or service name, the alert name, and the last time ok timestamp. Once the administrator has identified a pending issue or issues that the administrator would like to change to resolved, the administrator may provide input selecting the issue or issues to be changed to the user interface coordinator via the user interface. In response to receiving the input, the user interface coordinator changes the issue states of the selected issue records in the issue remediation database from pending to resolved. The user interface and user interface coordinator can be command line-based or web-based. That is, commands and input from the administrator may be received and output presented to the administrator via a shell command line or via web pages presented in a web browser or a mobile application on a mobile computing device.

The issue remediation coordinator may attempt to diagnose pending issues on a regular "diagnosis" interval. In one implementation, the diagnosis interval is ten minutes but may be different in different implementations according to the requirements of the particular implementation at hand. On the interval, the issue remediation coordinator may identify pending issues in the issue remediation database and instantiates issue objects for each of the identified pending issues based on the corresponding issue records retrieved from the issue remediation database. In some cases, the issue remediation coordinator may have already instantiated an issue object representing an issue that was pending at an earlier occurrence of the interval. Upon the occurrence of the current interval, the coordinator may simply check in the issue remediation database whether the issue represented by the issue object is still pending or was resolved since the earlier occurrence of the interval. If resolved, then the coordinator may not attempt to diagnose the issue on the current interval. If still pending, the coordinator may update the instantiated issue object with the current attributes of the corresponding issue record in the issue remediation database, if the attributes of the corresponding issue record were changed since the earlier occurrence of the interval. In this way, diagnosis of the issue on the current interval will be based on the current attributes of the issue. Note that the attributes of an issue as stored in the issue remediation database may change between diagnosis intervals as a result of changes to the corresponding issue record by the coordinator based on multiple issue objects with the same issue key but with different attribute sets returned by the GetIssues( ) function of an issue provider plugin over multiple occurrences of the get issue interval.

At a high level, once the coordinator has a set of issue objects to diagnose, the coordinator attempts to match each issue object with one or more issue diagnosis plugins 112, which also may be coded by a user. For each issue diagnosis plugin that an issue object is matched to, the coordinator requests the issue diagnosis plugin to diagnose the issue. If the issue diagnosis plugin is able to diagnose the issue, then the issue diagnosis plugin returns a prescription object that includes a remedy for the issue. The coordinator then schedules the remedy for execution against the information technology infrastructure, possibly only after receiving verification from an administrator that the prescription containing the remedy is authorized to proceed. In addition, even if the prescription is authorized, the coordinator may postpone execution of the remedy until certain conditions are satisfied. These conditions may be verified by one or more infrastructure protector plugins 113.

Protector plugins may be coded by a user to protect the information technology infrastructure from executing too many remedies at once against the infrastructure and to prevent executing a remedy against the infrastructure that might do more harm than good. One type of infrastructure protector plugin is referred to herein as a rate-limiter plugin. In general, the rate-limiter plugin ensures, according to a set of rate-limiting rules, that the rate of remedies being executed against the information technology infrastructure does not exceed a threshold rate, thereby protecting the information technology infrastructure from excessive consumption of computing resources of the infrastructure by the execution of remedies and reducing the likelihood that execution of remedies will cause downtime or problems with the infrastructure. Another type of infrastructure protector plugin is referred to herein as a resource verifier plugin. In general, the resource verifier plugin checks that resources of a host to which a remedy will be applied meet certain resource conditions before the remedy is applied to the host. For example, the resource verifier plugin may check that customer or other sensitive data stored on a disk of a host has been replicated to a quorum of other hosts in a cluster of hosts before a remedy is applied to the host to avoid potentially losing the only copy of the data if the application of the remedy to the host unintentionally or accidentally destroys the data on the disk. Other types of infrastructure protector plugins are possible and the API of the coordinator allows users to code specific protector plugins that meet the requirements of the infrastructure at hand without having to implement functions of the coordinator that are facilitated by the API.

Figure 4:
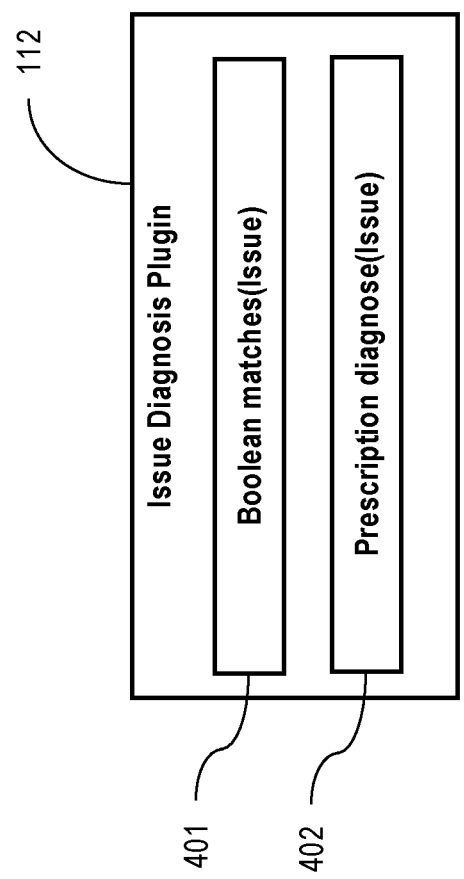
FIG. 4 is a schematic representation of an application programming interface offered by an issue diagnosis plugin according to an example embodiment of the present invention.

FIG. 4 is a schematic representation of the API provided by an issue diagnosis plugin to the issue remediation coordinator of the system according to an example embodiment of the present invention. The issue diagnosis plugin may be an instance of a class or prototype defined in a computer programming language (e.g., PYTHON, JAVA, etc.) and instantiated in a computer storage media (e.g., RAM). As shown, the issue diagnosis plugin offers a matches function 401 and a diagnose function 402.

The issue remediation coordinator can invoke or call the matches function passing an issue object. The diagnosis plugin returns a Boolean value that specifies whether the diagnose plugin is capable of diagnosing the issue represented by the issue object. If the return value from the matches function is true, then the coordinator may call or invoke the diagnose function passing the same issue object. If the return value from the matches function is false, then the coordinator should not call the diagnose function with an issue object that does not match the diagnosis plugin. The matches function of the diagnosis plugin may inspect the attributes and/or the issue key of a passed issue object to determine whether the diagnosis plugin can diagnosis the issue. For example, a diagnosis plugin may be configured to diagnosis issues with a certain type of service such as, for example, the Secure Shell (SSH) service. This diagnosis plugin may inspect attributes and/or the issue key for an issued object passed to the matches function of the plugin to determine if the issue object represents an issue with the SSH service at a host. If it does, then the plugin may be configured to return true from the matches function, or false otherwise. Inspecting attributes and/or the issue key of an issue object within the matches function may involving comparing the value of the attributes to predefined values or predefined regular expressions or other patterns to determine whether the attribute value matches the predefined value or the predefined regular expression or other pattern.

While in some embodiments such as depicted in FIG. 4, a diagnosis plugin offers separate matches and diagnose functions, a diagnosis plugin offers a diagnose function but not a matches function in other embodiments. In these other embodiments, the functionality of the matches function may be incorporated into the functionality of the diagnose function and the diagnose function may be called on every available diagnosis plugin for every issue being diagnosed, as opposed to being called only if the matches function returns True or an equivalent value. However, in these other embodiments, the diagnose function may return a NULL value, raise an exception, or otherwise programmatically indicate to the coordinator than the given issue does not match the diagnosis plugin if such is the case.

Figure 5:
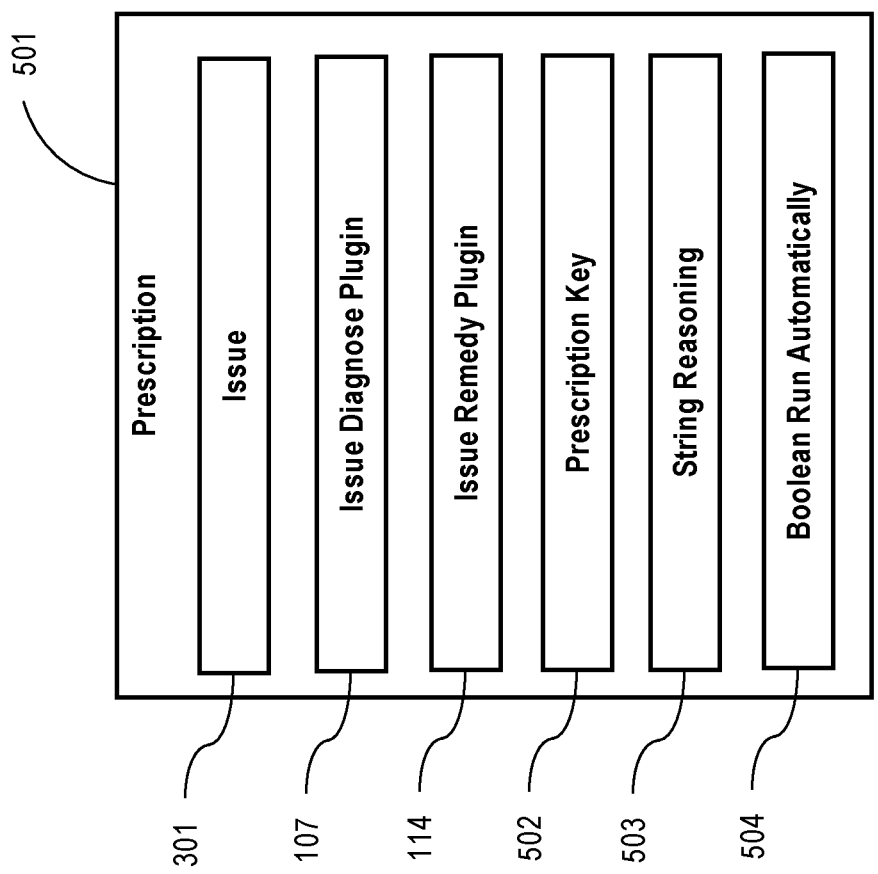
FIG. 5 is a schematic representation of an application programming interface offered by a prescription object according to an example embodiment of the present invention.

If the coordinator determines that an issue object matches an issue diagnosis plugin, then the coordinator may call the diagnose function of the plugin. If the diagnose plugin is able to diagnose a root cause or underlying cause of the issue, then the plugin returns a prescription object to the remediation coordinator. Prescription objects are discussed in greater detail below with respect to FIG. 5. However, in general, a prescription object represents a prescription for an issue represented by an issue object. Conceptually, a prescription is a combination of an issue, a diagnosis for the issue, and a remedy for the issue. Thus, a prescription includes a diagnosis and a remedy. A diagnosis may be defined generally as a set of instructions or commands (e.g., shell commands or scripting language instructions) which when executed against the information technology infrastructure (e.g., on a host having an issue) identify a remedy for an issue. A remedy than may be defined generally as a set of instructions or commands (e.g., shell commands or scripting language instructions) which when executed against the information technology infrastructure (e.g., on a host having an issue) fix or ameliorate the issue. A diagnosis may be encapsulated by an issue diagnosis plugin within the diagnose function of the plugin. A remedy may be encapsulated by an issue remedy plugin 114 within a remediate function of the plugin. Accordingly, as shown in FIG. 5, a prescription object 501 representing a prescription may reference an issue object that represents the issue the prescription is for, an issue diagnosis plugin to which the issue object was matched and which encapsulates the diagnosis that identified a remedy to the issue, and an issue remedy plugin that encapsulates the remedy.

A prescription object may also include a prescription key 502, a reasoning character string 503, and a run automatically flag 504. The prescription key may be based on a unique identifier of the issue diagnosis plugin and a unique identifier of the issue remedy plugin referenced by the prescription object. The unique identifier of the issue diagnosis plugin may uniquely identify the plugin among all issue diagnosis plugins available to the remediation coordinator. Similarly, the unique identifier of the issue remedy plugin may uniquely identify the plugin among all issue remedy plugins available to the remediation coordinator. For example, the identifier of a plugin can be the class name or the prototype name of the class or prototype that is instantiated as an object in computer storage media to provide the plugin. It should be noted that the prescription key may not uniquely identify the prescription object. This is because multiple prescriptions for different issues may have the same diagnosis and the same remedy. For example, if the SSH service is down at multiple hosts, then this may result in multiple issue objects with different issue keys and multiple prescription objects with the same prescription key each referring to the same issue diagnosis plugin and the same issue remedy plugin. Accordingly, a combination of the issue key of the issue object referenced by a prescription object and the prescription key of the prescription object may be used to uniquely identify the prescription object.

While in some embodiments the prescription key of a prescription object is by default based on a unique identifier of the issue diagnosis plugin and a unique identifier of the issue remedy plugin referenced by the prescription object, the prescription key may be based on other information in addition to or instead of this default information in other embodiments. For example, the other information may include the issue key of the issue object referenced by the prescription object. In some cases, the prescription key for a prescription object may be based on identifiers of the host(s) or service(s) that will be affected by the remedy of the prescription object. A remedy may affect a host or service if it performs an operation that changes the state of the host or service (e.g., rebooting or restarting the host or service). By basing the prescription key of a prescription object on identifiers of the hosts or services affected by the remedy of the prescription object, prescription objects referencing the same diagnosis plugins and the same remedy plugins will have different prescription keys if the remedy for the prescription objects differs with respect to the hosts or services affected. This is useful for forcing separate authorization of each remedy. For example, after a first time an issue is detected, a first prescription object with a remedy that affects (e.g., reboots) hosts A and B may be created with a prescription key that is based on identifiers of hosts A and B. Later the same issue may be detected again and a second prescription object with the same remedy but that affects (e.g., reboots) only host B may be created with a different prescription key that is based on an identifier of host B but not host A. Because the first prescription object and the second prescription object have different prescription keys, the remedies of each prescription are separately authorized even though both the first and second prescription objects may be for the same issue and reference the same diagnosis and remedy plugins.

The run automatically flag may be checked by the remediation coordinator to determine if the remedy of the prescription should be executed automatically without first obtaining authorization from an administrator. When a prescription object is obtained from an issue diagnosis plugin, the remediation coordinator may store a prescription record in a prescriptions table in the issue remediation database. The prescription record may include such information as the issue key of the issue object referenced by the prescription object, the prescription key of the prescription object, an identifier of the issue remedy plugin that is referenced by the prescription object, and a remediation state. The remediation state may be one of waiting for authorization, ready for scheduling, scheduled, executing, completed, and aborted, among other possible remediation states. If the run automatically flag in a prescription object obtained by the remediation coordinator from a call to the diagnose function of an issue diagnosis plugin is set to false, then the remediation coordinator may store a prescription record in the database with a remediation state of waiting for authorization. If true, then the remediation state of the prescription record may be stored as ready for scheduling. If a prescription record already exists in the database with a remediation state that is not either waiting for authorization or ready for scheduling, then the remediation coordinator may not update the existing prescription record in the case the remedy has already been scheduled, is executing, completed execution, or was aborted.

Figure 6:
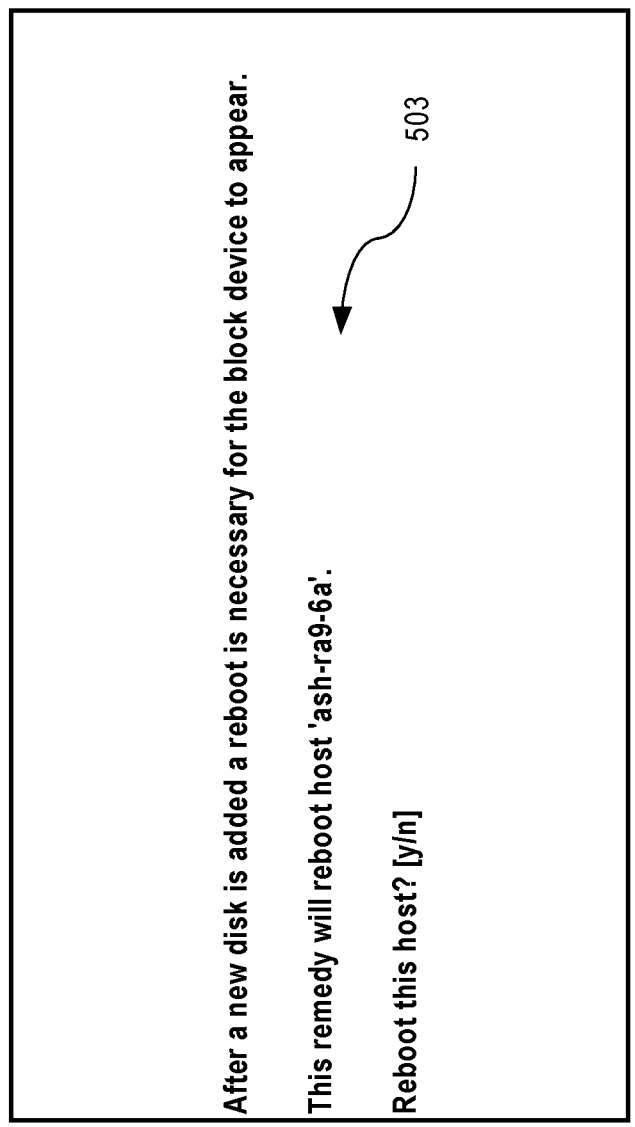
FIG. 6 is a schematic representation of a user interface for informing an administrator about a remedy when the administrator is deciding whether to authorized the remedy according to an example embodiment of the present invention.

The user interface coordinator may provide via the user interface the ability of the administrator to search for, browse for, or locate prescription records in the remediation database that have a remediation state of waiting for authorization. The user interface and user interface coordinator may also allow the administrator to select a particular prescription record having a remediation state of waiting for authorization and to change the remediation state of the selected prescription record in the remediation database from waiting for authorization to ready for scheduling. After the particular prescription record is selected via the user interface and the user interface coordinator and before the remediation state of the prescription record is changed in the remediation database, the user interface coordinator may present to the administrator via the user interface the reasoning string of the prescription record, which was obtained from the corresponding prescription object when the remediation coordinator created the prescription record in the remediation database. This reasoning string may provide a short description of the remedy of the prescription the administrator may be about to authorize. The administrator can read the description to gain an understanding of what the remedy will do to the information technology infrastructure when executed. The administrator may then choose to authorize or not authorize the prescription by providing the appropriate input via the user interface. If the administrator authorizes the prescription, then the user interface coordinator sets the remediation state of the prescription record in the remediation database to ready for scheduling or similar remediation state. If the administrator does not authorize the prescription, then the remediation state is set to aborted or unauthorized or similar remediation state. FIG. 6 provides an example of reasoning string that may be presented to an administrator in the user interface before the administrator authorizes or does not authorize a remedy. In this example, the reasoning string explains that the remedy is to reboot a host named 'ash-ra9-6a'. The reasoning string also explains why the reboot is necessary. In particular, so that a new disk can be mounted as a device block at the host after the reboot.

If a diagnose plugin is unable to diagnose a root cause or cause of an issue, then the plugin may not return a prescription object to the remediation coordinator. For example, the diagnosis plugin may return none or null or raise an exception in this case. If the coordinator determines that an issue object does not match an issue diagnosis plugin at a diagnosis interval, then the coordinator may forego calling or invoking the diagnose function of the plugin with the issue object. If multiple issue diagnosis plugins return a prescription object for the same issue object at a diagnosis interval, then the remediation coordinator may treat this as an error because it is not clear which of the multiple prescription objects should be applied. Note that this situation is different from the situation where multiple prescriptions for the same issue are diagnosed at different diagnosis intervals. This is because the underlying or root cause of the issue may have changed between the intervals thereby resulting in one diagnosis and one prescription at one diagnosis interval and a different diagnosis and different prescription at a later diagnosis interval.

On a regular scheduling interval (e.g., every ten minutes) or on-demand, the remediation coordinator may query the prescriptions table in the remediation database for prescription records having a remediation state of ready for scheduling or other remediation state that indicates that the remedy of the prescription is ready to be scheduled for execution. As mentioned, the infrastructure protector plugins may include a rate-limiter plugin. The rate-limiter plugin may be configured with a set of rate-limiting rules, which may be stored in the remediation database accessible to the rate-limiter plugin. Each rate-limiting rule may include a Boolean expression on the attributes of an issue, an occurrence limit, and a time window. When the remediation coordinator identifies a prescription record in the remediation database that is ready to be scheduled, the remediation coordinator may instantiate a prescription record based on the information contained in the prescription record and pass the prescription object in a function call to the rate-limiter plugin. Given the prescription object, the rate-limiter plugin will determine when the remedy of the prescription represented by the prescription object can execute against the information technology infrastructure. Such determination may include ensuring that the execution of the remedy does not violate any rate-limiting rules.

The rate-limiter plugin may postpone execution of a remedy if immediate execution of the remedy would violate a rate-limiting rule to which the remedy is matched. To determine whether a given prescription object matches a given rate-limiting rule, the rate-limiter plugin applies the Boolean expression of the rule to the attributes of the issue object referenced by the prescription object. Generally, this means that the rule applies to the prescription if the issue remedied by the prescription is governed by the rule. The Boolean expression may be a character string formed of one or more key-value pairs. The key may refer to an attribute name in the set of attributes of an issue object. The value may be an expression (e.g., a literal value or a regular expression value) on the value of the attribute referred to by the key. If there are multiple key-value pairs in the Boolean expression they may be related together by Boolean operators (AND, OR, NOT). Key-values may be grouped for precedence within the Boolean expression using parentheses. The rate-limiter plugin may attempt to match each rate-limiting rule to a given prescription object. The remedy of the prescription object can be scheduled for immediate execution if immediate execution would not violate any of the execution rates of the rate-limiting rule(s) to which the prescription object was matched. The execution rate of a rate-limiting rule is expressed by the occurrence limit and the time window. For example, if the occurrence limit of a rate-limiting rule is one and the time window is six hundred seconds, then only one remedy of a prescription object that matches the rate-limiting rule can be executed against the information technology infrastructure every ten minutes. The rate-limiter plugin can return a value to the remediation coordinator that indicates how a remedy of a prescription object is to be scheduled for execution. The value may indicate that the remedy can be scheduled for immediate execution. Alternatively, the value may indicate that execution should be postponed. If postponed, the remediation coordinator and the rate-limiter plugin may check again at the next scheduling interval whether the remedy is now ready for immediate execution. Alternatively, the value returned by the rate-limiter plugin can indicate a time or time window in the future at which the remedy can be executed without violating the rates of any rate-limiting rules.

As mentioned, another possible type of infrastructure protector plugin is the resource verifier plugin. This plugin verifies that the information technology infrastructure is in a certain state before a remedy is executed against the infrastructure. For example, a resource verifier plugin may assess the state of a host on which a particular remedy is to be executed. For example, the resource verifier plugin may check CPU load, disk usage, or other performance metrics of the host to ensure that the host is not currently under performance stress before a remedy is executed against the infrastructure.

A resource verifier plugin may also be used to ensure that a replication quorum has been met with respect to data stored at a host before a remedy is executed against the host. For example, a particular host may be a cluster of machines that store customer data or end-user data or other sensitive or business-critical information. The information may be replicated among multiple machines in the cluster for redundancy and recovery purposes. For example, an online content management system that stores users' files and other content items may require that each content item be replicated to at least three machines in the cluster. In this case, if two of the three machines on which the content item is stored are lost, destroyed, or unrecoverable, then the content item is still available at the third server. A resource verifier plugin may be used to check that all business sensitive information stored at the particular host has been replicated to a quorum (e.g., three) of machines before a remedy is executed against or on the particular host. This ensures that business sensitive or critical information is not lost if the application of the remedy to the host renders the host unrecoverable or destroys the information stored at the host.

A resource verifier plugin may also be used, for example, that a host that is a cluster of machines consists of a threshold number of accessible machines before a remedy is applied to the cluster. For example, a resource verifier plugin may verify before a remedy is applied to a cluster than at least 80% of the machines in the cluster are accessible on the network. Accessibility of a machine on the network may be tested by a network ping operation performed against the machine or successfully establishing a TCP connection with machine or in another known way suitable for verifying the accessibility of the machine. If less than 80% of the machines in the cluster are accessible, then the resource verifier plugin may postpone the remedy to prevent execution of the remedy against the cluster from causing less than a quorum of machines in the cluster to be accessible.

The remediation coordinator may change the remediation state of a prescription record in the remediation database from ready for scheduling to scheduled after the prescription has been authorized (either automatically or by an administrator) and after infrastructure protector plugins have run. When changing the remediation state of a prescription record in the remediation database to scheduled, the remediation coordinator may also store scheduling information in the remediation database as part of the prescription record or in association with the prescription. The scheduling information may indicate a time or time window at which or during which the remedy of the prescription represented by the prescription record can be executed. The time or time window may be at or near the current time or at or near a time in the future. For example, the time window for execution of the remedy may be based on when the execution would not violate a rate or rates of one or more rate-limiting rules.

At a regular execution interval (e.g., every ten minutes) or on-demand, the remediation coordinator may query the prescriptions table in the remediation table for prescriptions that are ready to be applied. Such prescriptions may be represented by prescription records that have a remediation state of scheduled or similar remediation state. Further, the query may be limited to identifying prescription records associated with scheduling information that indicates that the prescription can be applied immediately. For example, the remediation coordinate may query the prescriptions table for prescription records with a remediation state of scheduled and containing or associated with an execution time that is equal to or before a current time or where the current time is within an execution time window.

Figure 7:
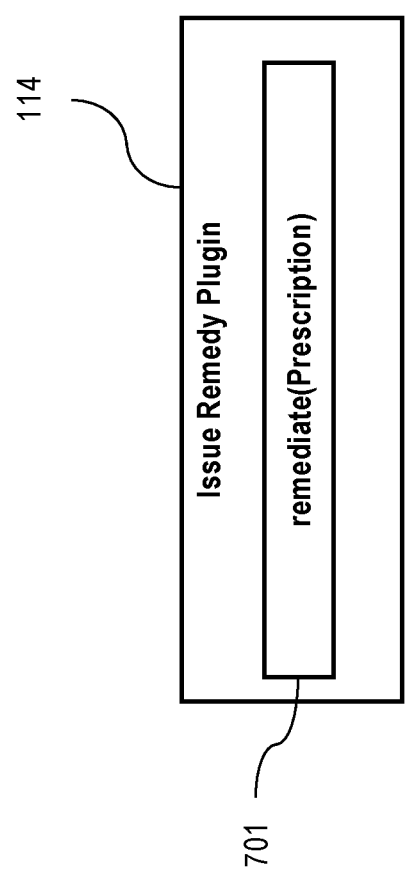
FIG. 7 is a schematic representation of an application programming interface offered by a prescription object according to an example embodiment of the present invention.

For each prescription record identified representing a prescription that is ready to be applied, the remediation coordinator may instantiate a prescription object based on information contained in the prescription record and pass the prescription object in a call or invocation of a remediate function of the issue remedy plugin referenced by the prescription object. FIG. 7 is a schematic representation of an application programming interface of an issue remedy plugin that may be coded by a user according to an example embodiment of the present invention. As shown, a remediate function 701 is offered. The remediate function accepts as a parameter a prescription object. Using information in the prescription object such as, for example, the attributes of the issue object referenced by the prescription object, the remediate function identifies a host in need of the remedy represented by the remediate function. For example, the host may be the host having the issue or a host with a service having the issue. The remediate function then executes one or more commands, scripts, programs on the host to attempt to remedy the issue. For example, the remediate function may be configured to SSH into the host and execute the commands, scripts, or programs at the host. The output (e.g., stdout or stderr) of the command, scripts, or programs may be captured and sent back over the network from the host to the remediation coordinator. The remediation coordinator may store the output in the remediation database for later examination, for example, via the user interface coordinator and the user interface. If the remediation coordinator is able to successfully call or invoke the remediate function, then the remediation coordinate may change the remediation state for the corresponding prescription record in the remediation database from scheduled to executing. If the remediation function completes successfully without returning an error or throw an exception, then the remediation coordinator may change the remediation state for the corresponding prescription record in the remediation database from executing to completed.

While in some embodiments such as described above, scheduling and executing remedies occur on separate intervals, scheduling and executing remedies occur on the same interval in other embodiments. Remedies that are ready for scheduling can be scheduled for execution and remedies that are ready for execution can be executed on a regular scheduling and execution interval (e.g., every ten minutes). For example, the coordinator may periodically poll the database for prescriptions that have been authorized and are ready to be executed. For each such prescription, the coordinator may execute any protector plugins and if none of the protector plugins postpone execution of the prescription's remedy, then the coordinator may immediately execute the remedy.

Method for Automated Issue Remediation

Figure 8:
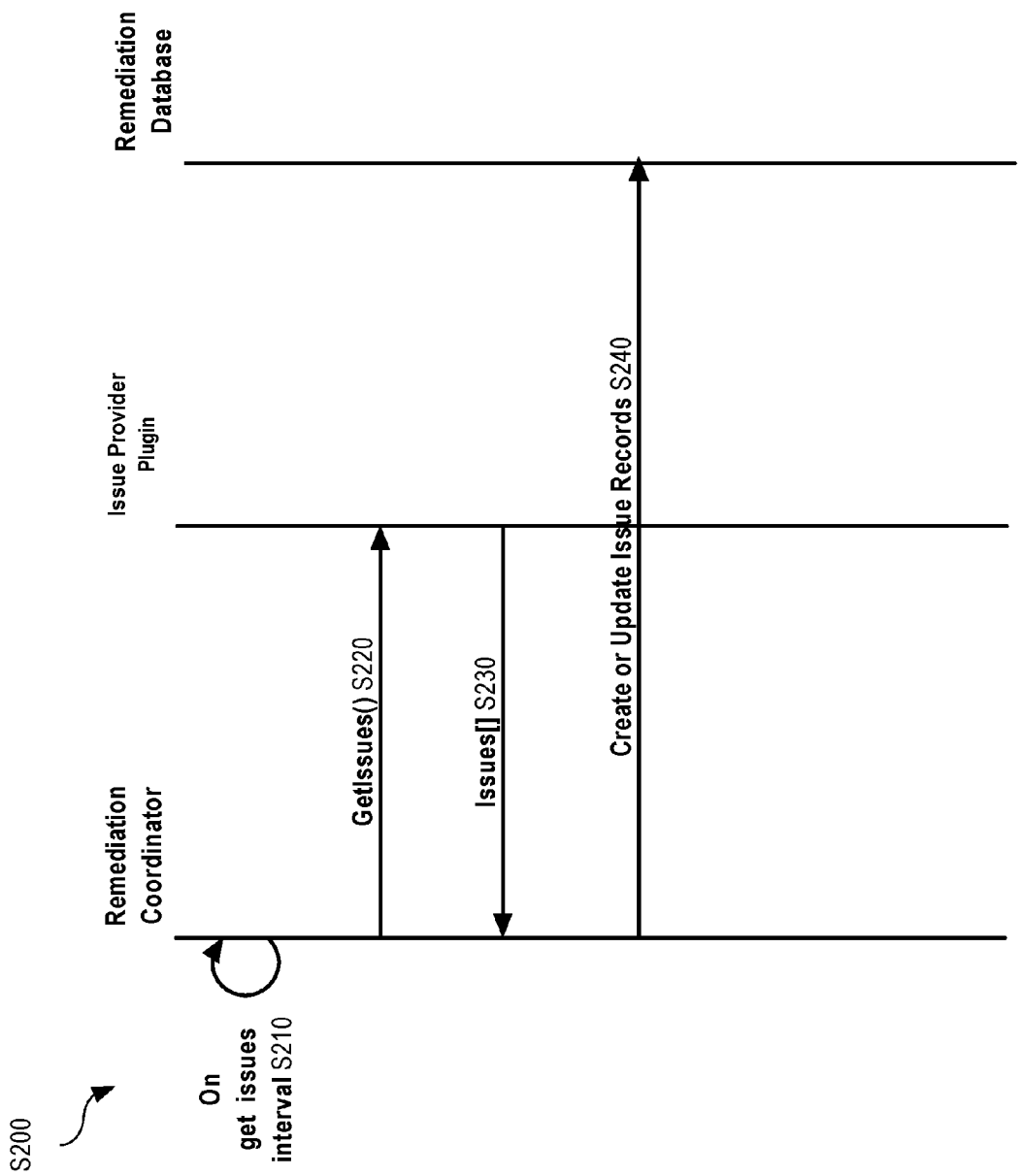
FIG. 8 is an interaction diagram of a process for getting issues according to an example embodiment of the present invention.

As shown in FIG. 8, a method S200 for automated issue remediation can include getting issues on a regular interval S210 (e.g., every five minutes). At one of the intervals, the remediation coordinator invokes or calls S220 the get issues function of each issue provider plugin available to the remediation coordinator. An invocation or call S220 returns S230 a list of zero or more issues as represented by zero or more issue objects. In some embodiments, call S220 returns only issue objects that represent pending issues. Based on the returned issues, the remediation coordinate creates or updates S240 issue records in the remediation database. Such creating may include creating an issue record with an issue state of pending. Updating an issue record may include updating the issue attributes of the issue record based on the issue attributes of the corresponding issue returned at S230. Updating an issue record may instead include changing the issue state from pending to resolved if the issue is no longer present as determined by the issue provider plugin.

Figure 9:
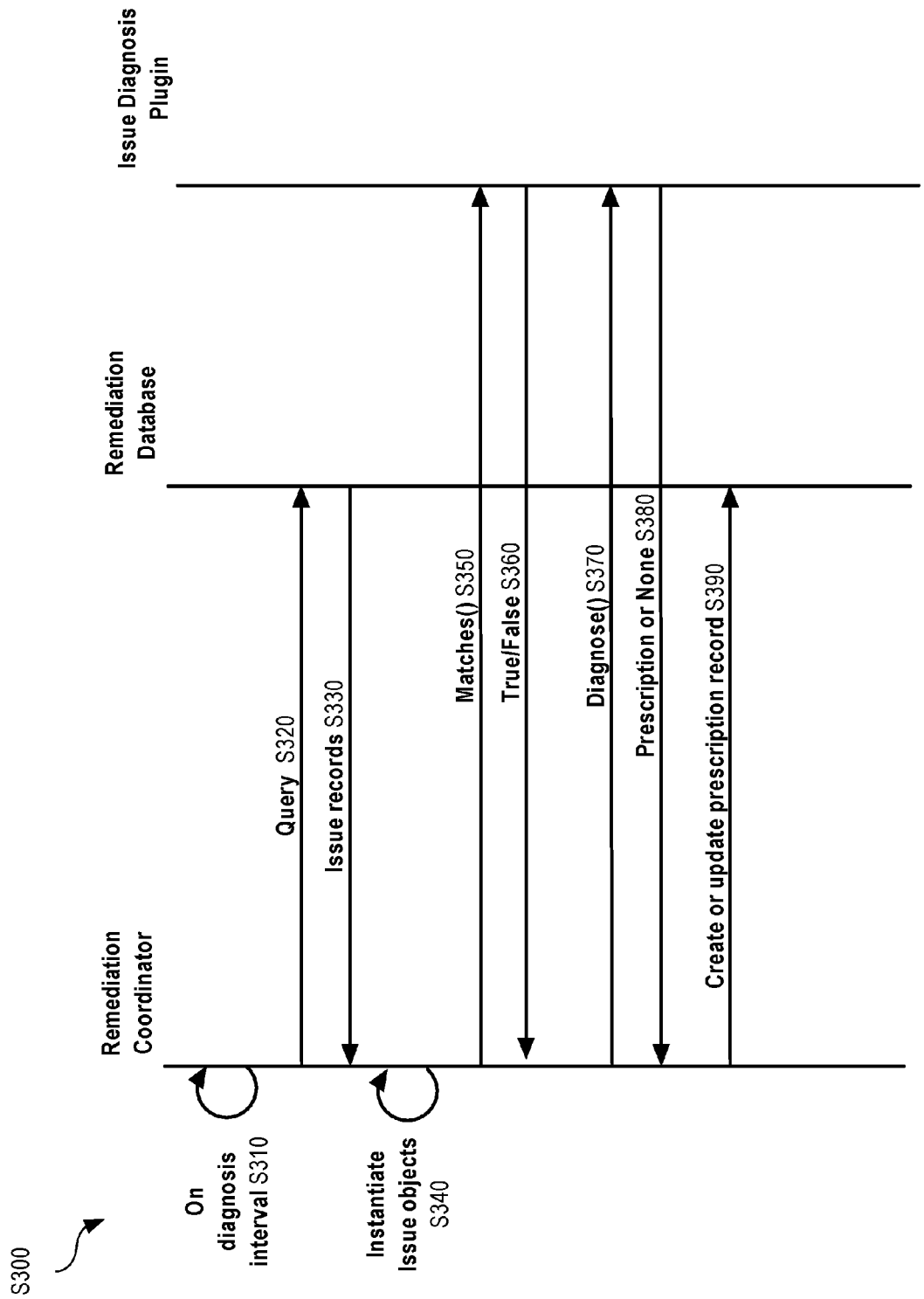
FIG. 9 is an interaction diagram of a process for diagnosing issues according to an example embodiment of the present invention.

As shown in FIG. 9, a method S300 for automated issue remediation can include diagnosing issues on a regular interval S310 (e.g., every ten minutes). On the interval, the remediation coordinator queries S320 the remediation database for issue records having an issue state of pending. The matching issue records are returned S330 from the remediation database to the remediation coordinator as an answer to the query S320. The remediation coordinator instantiates S340 issue objects from the issue records returned S330. The remediation coordinator calls or invokes S350 the matches function of each issue diagnosis plugin available to the coordinator with each instantiated S340 issue object. In each call or invocation S350 of the matches function of an issue diagnosis plugin, the remediation coordinator passes an instantiated S340 issue object as a parameter. The issue diagnosis plugin returns S360 a Boolean value indicating whether the passed issue object matches the issue diagnosis plugin. For each issue provider plugin to which an instantiated S340 issue object is matched, the remediation coordinator calls or invokes S370 the diagnose function of the issue provider plugin passing the matching issue object as a parameter. If the issue diagnosis plugin was able to diagnosis the issue represented by the passed issue object, then the issue diagnosis plugin returns S380 a prescription object to the remediation coordinator. If the issue diagnosis plugin was unable to diagnosis the issue, then the issue diagnosis plugin returns S380 None, NULL, throws an exception, or returns some other value that indicates that the issue diagnosis plugin was unable to diagnosis the issue represented by the issue object. In some embodiments, if an exception is raised or thrown, the exception contains information about why the diagnosis failed. This information may be stored in the database for examination by an administrator via the user interface.

For each prescription object returned S380 to the remediation coordinator, a corresponding prescription record is created or updated S390 in the remediation database. Recall, a prescription may be a combination of an issue, a diagnosis of the issue that identifies a remedy, and the remedy. Accordingly, a prescription object may be a combination of an issue object, an issue diagnosis plugin, and an issue remedy plugin. If a prescription record for a prescription object returned S380 from an issue diagnosis plugin does not exist in the remediation database, the remediation coordinator creates S390 one. If the run automatically flag of the prescription object is set to true or other equivalent value, then prescription record is created or updated in the remediation database with a remediation state of ready for scheduling. Otherwise, the prescription record is created or updated with a remediation state of waiting for authorization. If an existing prescription record exists in the remediation database for the same issue as identified by a prescription object returned S380 from an issue provider plugin and the remediation state of the existing prescription record indicates that the remedy of the prescription has not been executed or started execution and the prescription key of existing prescription record does not match the prescription key of the prescription object (e.g., because the underlying root cause of the issue has changed in the interim), then remediation coordinator treats the prescription of prescription object for the issue as superseding the prescription of existing prescription record for the issue. Accordingly, in this case, the remediation coordinator may change the remediation status of the existing prescription record to aborted or superseded or similar so that the remedy of the prescription represented by the existing prescription record is not executed. A prescription record representing the prescription object with a remediation status of waiting for authorization or ready for scheduling as dictated by the run automatically flag of the remediation object may then be created S390 in the remediation database by the remediation coordinator so that the superseding remedy for the issue is executed.

Figure 10:
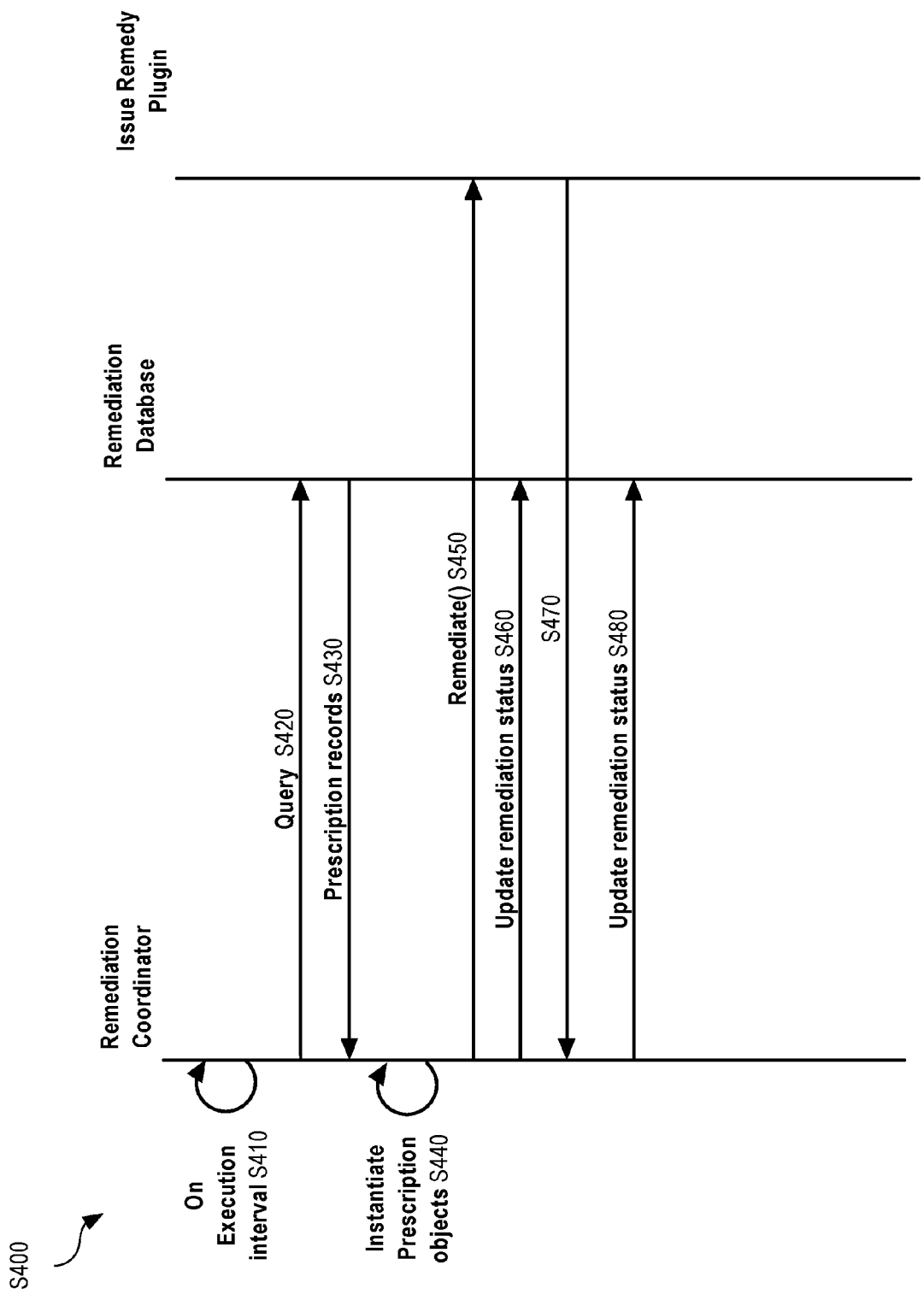
FIG. 10 is an interaction diagram of a process for executing remedies according to an example embodiment of the present invention.

As shown in FIG. 10, a method S400 for automated issue remediation can include attempting to execute remedies on a regular execution interval S410 (e.g., every ten minutes). At an execution interval, the remediation coordinator queries S420 the remediation database for prescription records that have a remediation status that indicates that the remedies of the corresponding prescriptions are ready to execute. The matching prescription records are returned S430 to the remediation coordinator in response to the query S420. A prescription record may match the query S420 if the record is associated with a scheduled execution time or a scheduled execution time window that satisfies a current time or other time specified in the query S420. A scheduled execution time may satisfy a specified time, if the execution time is equal to or earlier than the specified time. In this case, the execution time is a time not before which the corresponding remedy is to be executed. A scheduled execution time may satisfy a specified time, if the specified time falls within the scheduled execution time window. The remediation coordinator instantiates S440 prescription objects based on information in the matching prescription records. The remediation coordinator then calls or invokes S450 the remediate function of each issue remedy plugin referenced by each instantiated S440 prescription object. Before calling or invoking S450 the remediate function of a particular issue remedy plugin, the remediation coordinator may execute, call, or invoke one or more infrastructure protector plugins associated with the particular issue remedy plugin. If one or more of infrastructure protector plugins returns a value or throws an exception indicating that the particular issue remedy plugin is not ready to execute, then execution of the particular issue remedy plugin may be postponed and the remediation coordinator may not invoke S450 the remediate function on the current execution interval. Instead, the remediation coordinator may attempt to execute the remediate function at a next execution interval after successfully executing the one or more infrastructure protector plugins and verifying that the particular issue remedy plugin is ready to execute.

When the remediation coordinator calls or invokes S450 the remediate function of an issue remedy plugin, the remediation coordinator may then change S460 the remediation status of the corresponding prescription record in the remediation database to executing. If the remediate function successfully returns S470, then the remediation coordinator changes S480 the remediation status of the prescription record to complete. In some embodiments, the remediation coordinator changes S480 the remediation status of the prescription to complete based on obtaining a certain return value (e.g., False) from the verify_issue function discussed above indicating that the issue is now resolved.

Basic Computer Hardware

Figure 11:
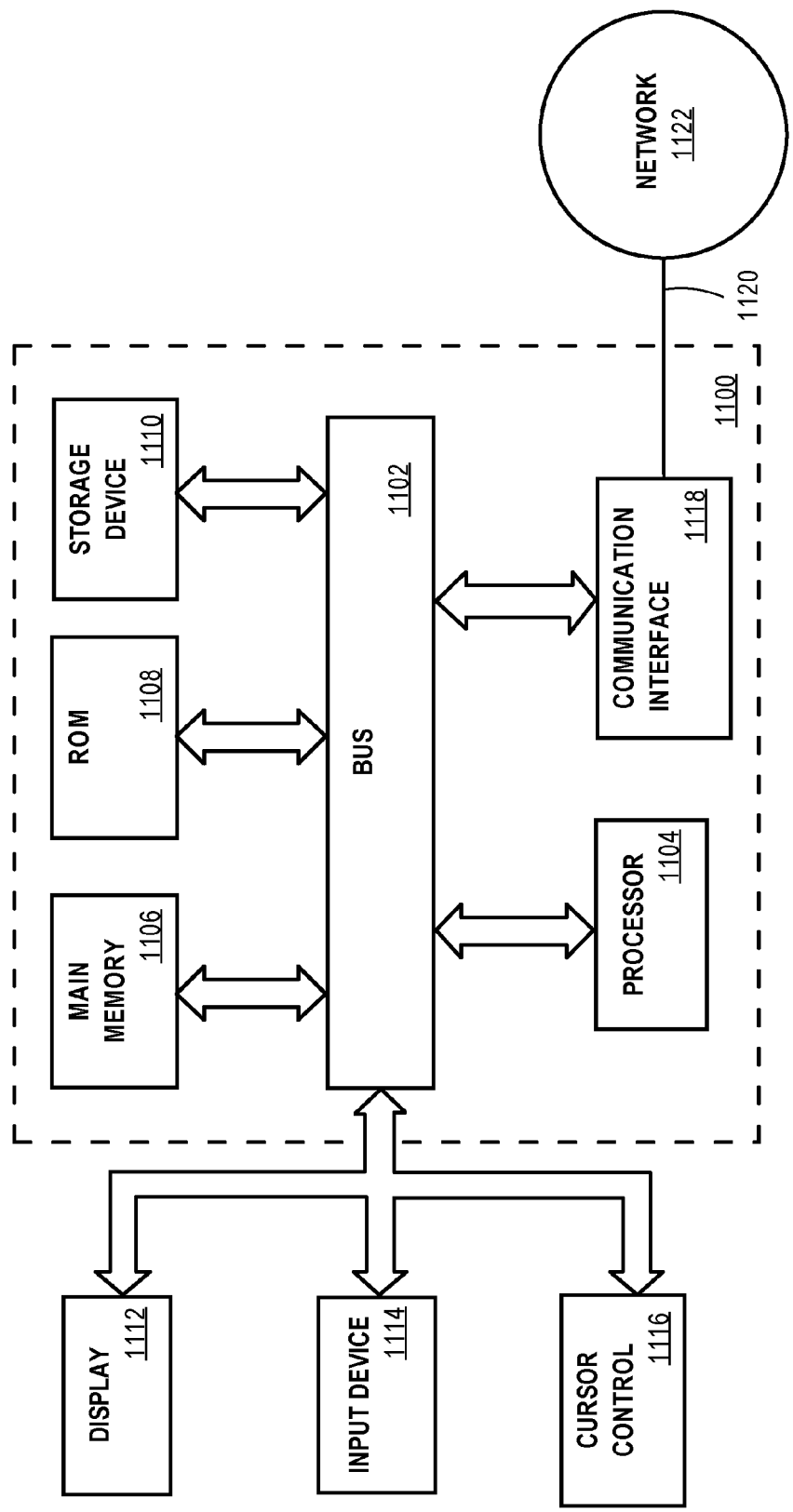
FIG. 11 is a schematic representation of basic computer hardware in which or with which the example embodiments of the present invention may be embodied or implemented.

Referring now to FIG. 11, it is a schematic representation that illustrates basic computer hardware 1100 in which or with which the example embodiments of the present invention may be embodied or implemented. Hardware 1100 and its components, including their connections, relationships, and functions, is meant to be exemplary only, and not meant to limit implementations of the example embodiments. Other computer hardware suitable for implementing the example embodiments may have different components, including components with different connections, relationships, and functions.

Hardware 1100 may include bus 1102 or other communication mechanism for addressing main memory 1106 and for transferring data between and among the various components of hardware 1100.

Hardware 1100 may also include processor 1104 coupled with bus 1102 for processing information (e.g., instructions). Processor 1104 may be a general purpose microprocessor, a system on a chip (SoC), a central processing units (CPUs), a graphics processing unit (GPU), or other computer processor.

Main memory 1106, such as a random access memory (RAM) or other dynamic storage device, also may be coupled to bus 1102 for storing information, data, metadata, or instructions to be executed or processed by processor 1104. Main memory 1106 also may be used for storing temporary variables or other intermediate information during execution of software instructions to be executed by processor 1104.

Software instructions, when stored in storage media accessible to processor 1104, render hardware 1100 into a special-purpose machine that is customized to perform the functions or operations specified in the software instructions. The terms "software," "instructions," "software instructions," "computer program," "computer-executable instructions," and "processor-executable instructions" are to be broadly construed to cover any machine-readable information, whether or not human-readable, for directly or indirectly instructing a processor to perform specific functions or operations. The machine-readable information may include, but is not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors. Machine-readable information may directly instruct a processor to perform specific functions or operations if the machine-readable information contains instructions (e.g., machine language instructions) that conform to an instruction set of the processor. Machine readable information may indirectly instruct a processor to perform specific functions or operations if the machine-readable information contains instructions (e.g., bytecode, portable code, interpreted programming language statements, etc.) that can be interpreted or compiled into or emulated by instructions that conform to an instruction set of the processor.

Hardware 1100 also may include read only memory (ROM) 1108 or other static storage device coupled to bus 1102 for storing static information and software instructions for processor 1104.

Mass storage device 1110 may be coupled to bus 1102 for persistently storing information and instructions on fixed or removable media, such as magnetic, optical, solid-state, magnetic-optical, flash memory, or any other available mass storage technology. The mass storage may be shared on a network, or it may be dedicated mass storage. Mass storage device 1110 may store a body of program and data for directing operation of the computing device, including an operating system, user application programs, driver and other support files, as well as other data files of all sorts.

Hardware 1100 may be coupled via bus 1102 to display 1112, such as a liquid crystal display (LCD) or other electronic visual display, for displaying information to a computer user. In some configurations, a touch sensitive surface incorporating touch detection technology (e.g., resistive, capacitive, etc.) may be overlaid on display 1112 to form a touch sensitive display for communicating touch input (e.g., via a finger or stylus) to processor 1104.

Input device 1114, including alphanumeric and other keys or one or more physical buttons or switches such as, for example, a power (on/off) button, a "home" button, volume control buttons, or the like, may be coupled to bus 1102 for communicating information and command selections to processor 1104.

Another type of user input device may be cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

In some configurations, one or more of display 1112, input device 1114, and cursor control 1116 are external components (e.g., peripheral devices) to a form factor of hardware 1100. In some configurations, some or all of display 1112, input device 1114, and cursor control 1116 are integrated as part of the form factor of hardware 1100.

Functions or operations of the disclosed methods may be performed by hardware 1100 in response to processor 1104 executing one or more programs of software instructions contained in main memory 1106. Such software instructions may be read into main memory 1106 from another storage medium, such as storage device 1110. Execution of the software instructions contained in main memory 1106 cause processor 1104 to perform the functions or operations of the example embodiments.

While functions and operations of the example embodiments may be implemented entirely with software instructions, hard-wired or programmable circuitry of hardware 1100 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or instructions. Such storage media may comprise non-volatile media and/or volatile media. Non-volatile media includes, for example, non-volatile random access memory (NVRAM), flash memory, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Hardware 1100 also may include communication interface 1118 coupled to bus 1102. Communication interface 1118 provides a two-way data communication coupling to network 1122, via a wired or wireless network link 1120. Network 1122 may include any number of different types of wired or wireless computer networks including, for example, Communication interface 1118 sends and receives electrical, electromagnetic, or optical signals that carry digital data streams representing various types of information including, for example, instructions or data.

Basic Software System

Figure 12:
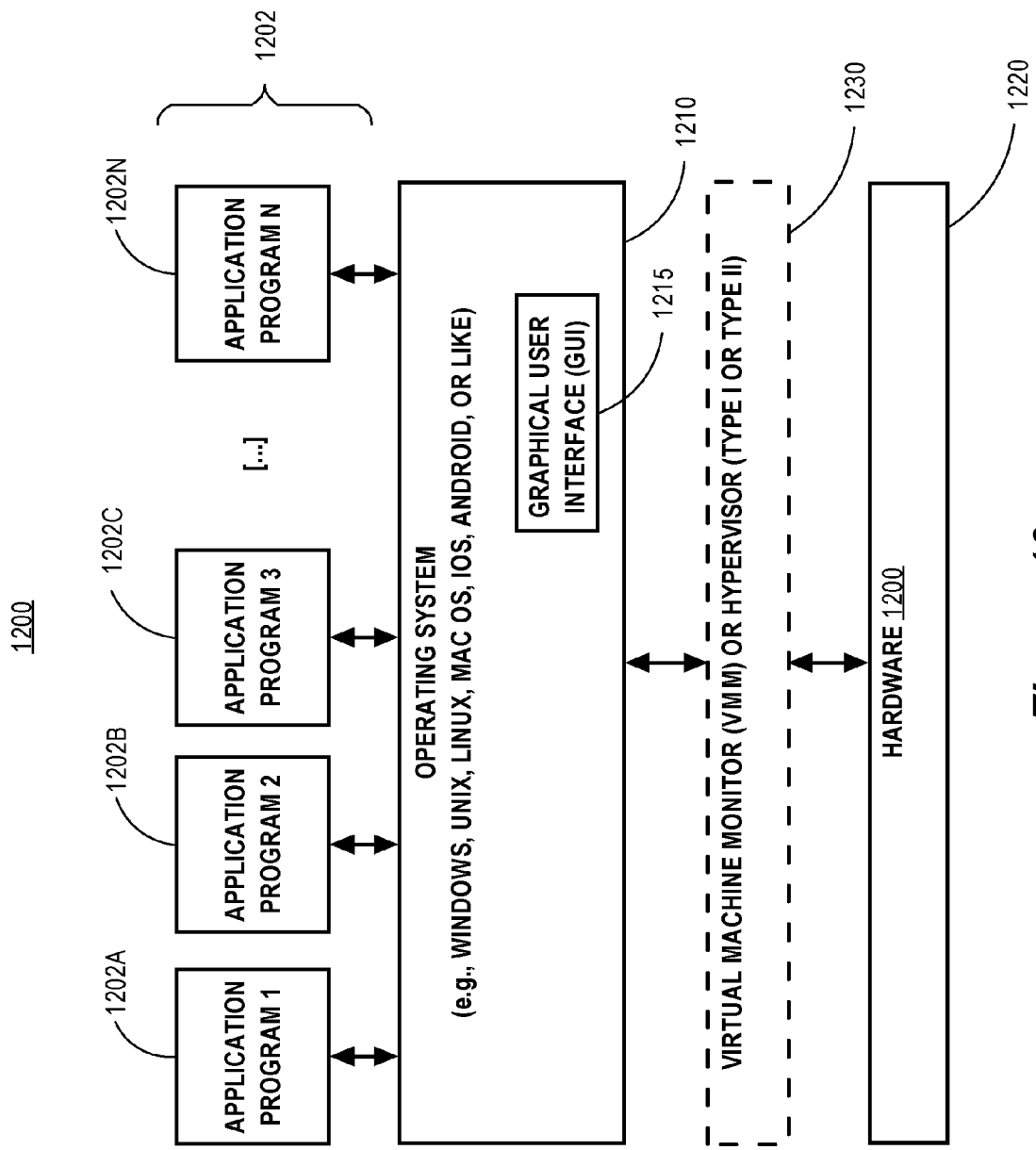
FIG. 12 is a schematic representation of a basic computer software system that may be employed for controlling the operation of hardware of FIG. 11.

FIG. 12 is a schematic representation of basic software system 1200 that may be employed for controlling the operation of hardware 1100. Software system 1200 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1200 is provided for directing the operation of hardware 1100. Software system 1200, which may be stored in main memory (RAM) 1106 and on fixed storage (e.g., hard disk or flash memory) 1110, includes kernel or operating system (OS) 1210.

OS 1210 manages low-level aspects of hardware operation, including managing execution of processes, memory allocation, file input and output (I/O), and device I/O. One or more application programs, represented as 1202A, 1202B, 1202C . . . 1202N, may be "loaded" (e.g., transferred from fixed storage 1110 into memory 1106) for execution by the system 1200. The applications or other software intended for use on system 1200 may also be stored as a set of downloadable computer-executable instructions, for example, for downloading and installation from an Internet location (e.g., a Web server, an app store, or other online service). OS 1210 can also be configured with a container platform (not shown) for executing applications 1202A-N within a software or virtual container (e.g., DOCKER).

Software system 1200 includes graphical user interface (GUI) 1215, for receiving user commands and data in a graphical (e.g., "point-and-click" or "touch gesture") fashion. These inputs, in turn, may be acted upon by the system 1200 in accordance with instructions from operating system 1210 and/or applications 1202A-N. GUI 1215 also serves to display the results of operation from OS 1210 and applications 1202A-N, whereupon the user may supply additional inputs or terminate the session (e.g., log off).

OS 1210 can execute directly on bare hardware 1100. Alternatively, hypervisor or virtual machine monitor (VMM) 1230 may be interposed between hardware 1100 and OS 1210. In this configuration, VMM 1230 acts as a software "cushion" or virtualization layer between OS 1210 and hardware 1100.

VMM 1230 instantiates and runs one or more virtual machine instances ("guest machines"). Each guest machine comprises a "guest" operating system, such as OS 1210, and one or more applications, such as applications 1202A-N, designed to execute on the guest operating system. VMM 1230 presents the guest operating systems with a virtual operating platform and manages the execution of the guest operating systems.

In some instances, VMM 1230 may allow a guest operating system to run as if it is running on hardware 1100 directly. In these instances, the same version of the guest operating system configured to execute on hardware 1100 directly may also execute on VMM 1230 without modification or reconfiguration. In other words, VMM 1230 may provide full hardware and CPU virtualization to a guest operating system in some instances.

In other instances, a guest operating system may be specially designed or configured to execute on VMM 1230 for efficiency. In these instances, the guest operating system is "aware" that it executes on a virtual machine monitor. In other words, VMI 1230 may provide para-virtualization to a guest operating system in some instances.

The above-described basic computer hardware and software is presented for purpose of illustrating the basic underlying computer components that may be employed for implementing the example embodiments. The example embodiments, however, are not necessarily limited to any particular computing environment or computing device configuration. Instead, the example embodiments may be implemented in any type of system architecture or processing environment that one skilled in the art, in light of this disclosure, would understand as capable of supporting the features and functions of the example embodiments presented herein.

Extensions and Alternatives

In the foregoing specification, the example embodiments of the present invention have been described with reference to numerous specific details. However, the details may vary from implementation to implementation according to the requirements of the particular implement at hand. The example embodiments are, accordingly, to be regarded in an illustrative rather than a restrictive sense.

The invention claimed is:

1. A method for extensible, protective, and verifiable automated issue remediation for information technology infrastructure comprising:
    invoking an application programming interface to obtain at least one issue object corresponding to an alert for a host generated by a monitoring system;
    matching the issue object to at least one diagnosis plugin of a plurality of diagnosis plugins, the at least one diagnosis plugin encapsulating a first set of computer-executable instructions for execution at a host for which the alert is generated by the monitoring system, the first set of computer-executable instructions configured to diagnose the alert at the host;
    based on causing the first set of computer-executable instructions encapsulated by the at least one diagnosis plugin to be executed at the host, obtaining a prescription object from the at least one diagnosis plugin, the prescription object referencing a remedy plugin, the remedy plugin encapsulating a second set of computer-executable instructions for execution at the host for which the alert is generated by the monitoring system, the second set of computer-executable instructions configured to remedy the alert at the host;
    using an infrastructure protector plugin to determine whether execution of the second set of computer-executable instructions at the host should be postponed; and
    based on using the infrastructure protector plugin to determine that the second set of computer-executable instructions are ready to be executed at the host, causing the second set of computer-executable instructions to be executed at the host, after verifying the second set of computer-executable instructions are authorized to be executed at the host.

2. The method of claim 1, further comprising executing the second set of computer-executable instructions at the host for which the alert is generated using a secure shell (SSH).

3. The method of claim 1, wherein the issue object comprises a set of one or more key-value pairs; and wherein at least one of the key-value pairs in the set of one or more key-value pairs specifies an identifier of a host for which the alert is generated by the monitoring system.

4. The method of claim 1, wherein matching the issue object to the at least one diagnosis plugin comprises passing the issue object as a parameter in a call to a function of the diagnosis plugin and receiving, in response to the call, a return value indicating whether the issue object matches the diagnosis plugin.

5. The method of claim 1, wherein a prescription object comprises a reference to the at least one issue object, a reference to the diagnosis plugin, and a reference to a remedy plugin.

6. The method of claim 1, further comprising:
    matching the at least one issue object to a rate-limiting rule; and
    executing the second set of computer-executable instructions after postponing execution of the second set of computer-executable instructions so as not to exceed a rate threshold of the rate-limiting rule.

7. The method of claim 1, further comprising:
    executing the second set of computer-executable instructions at the host after verifying that data stored at the host is replicated to a quorum of machines.

8. The method of claim 1, wherein the verifying the second set of computer-executable instructions are authorized to be executed at the host comprises checking a value of the prescription object indicating whether the second set of computer-executable instructions are automatically authorized to be executed at the host.

9. The method of claim 1, wherein the verifying the second set of computer-executable instructions are authorized to be executed at the host comprises:
    presenting a description of the second set of computer-executable instructions in a user interface; and receiving user input via the user interface specifying that the second set of computer-executable instructions are authorized to be executed at the host.

10. The method of claim 1, wherein obtaining a prescription object from the diagnosis plugin comprises calling a function of the diagnosis plugin passing the at least one issue object as a parameter and obtaining a reference to the prescription object as a return value from the function.

11. A system for extensible, protective, and verifiable automated issue remediation for information technology infrastructure comprising:
one or more processors; and
one or more storage media storing one or more computer programs for execution by the one or more processors, the one or more computer programs comprising instructions for:
invoking an application programming interface to obtain at least one issue object corresponding to an alert for a host generated by a monitoring system;
matching the issue object to at least one diagnosis plugin of a plurality of diagnosis plugins, the at least one diagnosis plugin encapsulating a first set of computer-executable instructions for execution at a host for which the alert is generated by the monitoring system, the first set of computer-executable instructions configured to diagnose the alert at the host;
based on causing the first set of computer-executable instructions encapsulated by the at least one diagnosis plugin to be executed at the host, obtaining a prescription object from the at least one diagnosis plugin, the prescription object referencing a remedy plugin, the remedy plugin encapsulating a second set of computer-executable instructions for execution at the host for which the alert is generated by the monitoring system, the second set of computer-executable instructions configured to remedy the alert at the host;
using an infrastructure protector plugin to determine whether execution of the second set of computer-executable instructions at the host should be postponed; and
based on using the infrastructure protector plugin to determine that the second set of computer-executable instructions are ready to be executed at the host, causing the second set of computer-executable instructions to be executed at the host, after verifying the second set of computer-executable instructions are authorized to be executed at the host.

12. The system of claim 11, the one or more computer programs further comprising instructions for executing the second set of computer-executable instructions at the host for which the alert is generated using a secure shell (SSH).

13. The system of claim 11, wherein the issue object comprises a set of one or more key-value pairs; and wherein at least one of the key-value pairs in the set of one or more key-value pairs specifies an identifier of a host for which the alert is generated by the monitoring system.

14. The system of claim 11, wherein the instructions for matching the issue object to the at least one diagnosis plugin comprise instructions for:
passing the issue object as a parameter in a call to a function of the diagnosis plugin; and
receiving, in response to the call, a return value indicating whether the issue object matches the diagnosis plugin.

15. The system of claim 11, wherein a prescription object comprises a reference to the at least one issue object, a reference to the diagnosis plugin, and a reference to a remedy plugin.

16. The system of claim 11, the one or more computer programs further comprising instructions for:
matching the at least one issue object to a rate-limiting rule; and
executing the second set of computer-executable instructions after postponing execution of the second set of computer-executable instructions so as not to exceed a rate threshold of the rate-limiting rule.

17. The system of claim 11, the one or more computer programs further comprising instructions for:
executing the second set of computer-executable instructions at the host after verifying that data stored at the host is replicated to a quorum of machines.

18. The system of claim 11, wherein the instructions for verifying the second set of computer-executable instructions are authorized to be executed at the host comprise instructions for checking a value of the prescription object indicating whether the second set of computer-executable instructions are automatically authorized to be executed at the host.

19. The system of claim 11, wherein the instructions for verifying the second set of computer-executable instructions are authorized to be executed at the host comprise instructions for:
presenting a description of the second set of computer-executable instructions in a user interface; and
receiving user input via the user interface specifying that the second set of computer-executable instructions are authorized to be executed at the host.

20. The system of claim 11, wherein the instructions for obtaining a prescription object from the diagnosis plugin comprise instructions for:
calling a function of the diagnosis plugin passing the at least one issue object as a parameter; and
obtaining a reference to the prescription object as a return value from the function.

* * * * *